3,796,816
HARD BUTTER COMPOSITIONS FROM NON-RANDOMIZED TRIGLYCERIDES

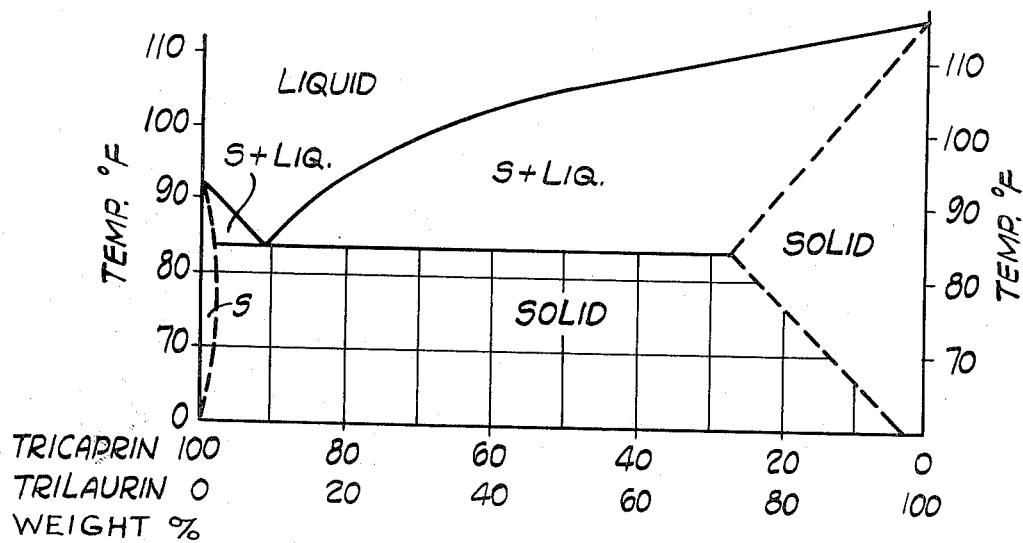

John Michael Hasman and Richard Joseph Zielinski, Middleburg Heights, Ohio, assignors to SCM Corporation, Cleveland, Ohio
Filed July 5, 1972, Ser. No. 269,200
Int. Cl. A23g 3/00
U.S. Cl. 426—201
4 Claims

ABSTRACT OF THE DISCLOSURE

A hard butter having a solid content index over a temperature range from 80° to about 92° F. consisting essentially of from about 45% to 80% of glycerol tricaprin, from about 20% to 55% glycerol trilaurin, and 0% to 8% of partial glycerides, the fatty acid moiety having from 8 to 22 carbon atoms and confectioners coatings employing this hard butter.

---

Hard butters are widely known in the confectionery industry and refer to a class of triglycerides having special physical and performance qualities for making coatings for confectioners products. There are essentially three types of hard butters commercially available; one is a lauric hard butter, another is a domestic hard butter comprising a mixture of fractionated triglycerides, and lastly cocoa butter.

Because of the type of application for which hard butters are used, they must have a very short softening range temperature and be substantially completely liquid at temperatures approximating that of the human body. On the other hand, a hard butter must be solid at ordinary room temperatures; e.g., 70° to 75° F. Further, the hard butter should remain firm and brittle; that is, having a sharp break or "snap" at such temperature. The crystal arrangement should remain stable for a period of at least 6 months and preferably up to two years as the products produced with such hard butters often are on the shelf or in vending machines for a substantial period of time. Hard butters must additionally have the characteristic that they can be blended with other ingredients or compatible with other ingredients such as cocoa powder, chocolate liquor, etc. so that the resulting confectioners product produced with the hard butters will have a desirable appearance and taste. General descriptions and characteristics of hard butters can be found in U.S. Pats. 2,726,158; 2,783,151; 3,592,940; and 3,595,673.

It has been found that a mixture of from about 45% to 80% glycerol tricaprin, 20% to 55% glycerol trilaurin, and 0% to 8% of a partial fatty acid ester of glycerol, the fatty acid moiety having from 8 to 22 carbon atoms, exhibits hard butter characteristics. Coating features produced by the hard butter include excellent stability, desirable mouth feel in that the hard butter is substantially liquid at body temperature, and particularly unike higher molecular weight saturated glycerides, it is easily metabolized. Another advantageous feature is that it expands or grows in volume on continued melting and freezing cycles which is useful for novelty items.

FIG. 1 is a phase diagram of a physical blend of mixtures of glycerol tricaprin and glycerol trilaurin.

The hard butter compositions of this invention are physical blends of two substantially pure mono acid non-randomized (preferably less than 10% randomized) triglyceride compositions; i.e., glycerol tricaprin and glycerol trilaurin, the major acid component of each triglyceride being 90% or greater. Randomized refers to a glyceride having dissimilar fatty acid radical moieties pendant from the molecule whereas a non-randomized glyceride refers to a glyceride having like fatty acid radicals pendant from the molecule. It is preferred to have the glycerides non-randomized as the randomized mixture of glycerol tricaprin and glycerol trilaurin does not provide desirable hard butter characteristics that are noted by these hard butter compositions. Apparently, the mixture of fatty acid moieties in randomized glycerides interferes with the properties in terms of solid content index (SCI) thereby often making the compositions undesirable for hard butter applications.

Another aspect of this invention is a confectioners coating using a hard butter consisting essentially of from about 45% to 80% glycerol tricaprin, from 25% to 55% glycerol trilaurin, and 0% to 8% of a partial fatty acid ester of glycerol.

Glycerol tricaprin as well as glycerol trilaurin, of course, are known in the art and can be prepared in a variety of ways. One of the more simple ways of synthesizing relatively nonrandomized products is by the fatty acid esterification of glycerol employing the corresponding fatty acid as a reactant. For example, in making glycerol tricaprin, capric acid is used as the fatty acid, and it is reacted with glycerol. In the other case, lauric acid is reacted with glycerin. Esterification is carried out in conventional manner using a base, typically an alkali metal hydroxide as a catalyst and heating to a temperature of about 220° C. until the reaction is complete. Another method for preparing the triglycerides is to react a fatty acid chloride with glycerol and removing byproduct HCl.

FIG. 1 is a phase diagram for a physical blend of glycerol tricaprin and glycerol trilaurin and is obtained by plotting the solid-liquid lines as a function of temperature versus proportion of components in the mixture. Referring to the graph, it can be observed that a blend of glycerol tricaprin and glycerol trilaurin in a proportion of from 45% to 80% glycerol tricaprin and 20% to 55% glycerol trilaurin is substantially solid at a temperature below 82° F. and is completely liquid at a temperature of from above about 97° F. to 108° F. at the higher proportion of glycerol trilaurin.

It can also be observed from the phase diagram that at levels below about 20% trilaurin, the melting point is too low, and, therefore the hard butter often is undesirable for making confectioners coatings. They are undesirable because coatings made with these hard butters become tacky and sticky at temperatures slightly above room temperature. When the composition contains above about 55% trilaurin, the solids content of the hard butter composition becomes sufficiently high so as to create a waxy feel to the mouth. A preferred range for a hard butter is a glycerol tricaprin proportion of from 60% to 75% and from 25% to 40% glycerol trilaurin as substantially all of the hard butter composition is in liquid phase at temperatures of about 98° to 104° F. This proportion of glycerol tricaprin and glycerol trilaurin provides desirable mouth feel while having desirable low temperature characteristics; i.e., that of remaining solid at temperatures below about 83° F.

In referring to tricaprin and trilaurin as triglycerides it is also meant to refer to the inclusion of not more than 8% and preferably less than 2% to 3% of mono- and di-glycerides. Sometimes it is difficult to obtain complete esterification of glycerin and there may be some mono- or dilaurin or mono- and dicaprin in the residue of trilaurin or tricaprin. But substantially complete esterification is preferred as the solids content index for a hard butter having larger proportions of mono- and di-ester may depart from the standards acceptable.

Optionally, partial glycerides where the fatty acid moiety has from 8 to 22 carbon atoms can be included where desired in the physical blend of glycerol tricaprin and glycerol trilaurin. Exemplary of the fatty acid moieties of such glycerides are steric, oleic, palmitic, linolenic, linoleic moiety. Usually where saturated high molecular weight fatty acids ($C_{16-18}$) are present as in the case of mono and distearin, preferably, only a small proportion of glyceride is included in the physical blend as such inclusion adversely affects the hard butter characteristics of the blend of tricaprin and trilaurin. As the molecular weight or melting temperature of the fatty acid approaches that of lauric acid, usually more of the glyceride can be tolerated in the blend of tricaprin and trilaurin; but even in this case, the additional glyceride is not preferred.

Another aspect of the invention is a confectioners coating utilizing the hard butter described herein; i.e., essentially a physical blend of tricaprin and trilaurin. There is substantial information on confectioners coatings and this is widely reported in the patent literature; e.g., U.S. Pat. 3,199,984. This reference and those cited therein are incorporated by reference to show the state of the art.

Typically, the confectioners coatings are of two types: one is a chocolate coating; and the other a pastel coating, the pastel coating differing from the chocolate in that there is no cocoa powder introduced in the formulation. The hard butters of this invention when incorporated to the confectioners coatings either of the chocolate or pastel type produce a coating having a mouth feel desired in a confectioners coating and yet they are advantageous from the standpoint that they are easily digested by the body.

Generally, a confectioners coating composition comprises a dispersion of finely ground cocoa solids, sugar, salt flavoring agent, skim milk solids, emulsifiers, and a hard butter. A broad formulation for a confectioners coating is as follows:

| Ingredients: | Percent by wt. |
|---|---|
| Cocoa | 0–20 |
| Hard butter | 26–38 |
| Powdered sugar | 37–47 |
| Dry skim milk | 0–10 |
| Salt | 0.1–0.3 |
| Emulsifier | 0.25–1.5 |
| Flavoring | 0.1–0.2 |

The pastel coating, of course, would have no cocoa powder in the coating composition whereas light chocolate coatings would contain from 5% to 8% cocoa powder and dark chocolate coatings from 15% to 20% cocoa powder.

The above formulations for confectioners coatings, of course, are general and can be varied as desired, as this is within the skill of those in the confectioners art. The important aspect is to include a preponderance and preferably at least 75% of the hard butter of this invention in the confectioners coating. Other types of hard butters which can be used in combination with the hard butter of this invention can be any of the conventional ones listed in the patents cited hereinbefore relating to the general art of hard butters; e.g., lauric and fractionated triglycerides.

Emulsifiers commonly used for making confectioners coatings can be used for making the confectioners coatings of this invention. Examples of emulsifiers include: lecithin, polyoxyethylene esters of higher fatty acids; e.g., polyoxyethylene sorbitan monostearate, lactylated esters of glycerol; e.g., glycerol lactopalmitate, higher fatty acid esters of polyhydric alcohols; e.g., sorbitan and sorbitol monostearate, sorbitan and sorbitol monooleate, mono- and diglycerides.

Flavorants often used are vanillin and ethyl vanillin, however, synthetic flavors of the fruit types can be used as desired.

The following example is provided to illustrate a preferred embodiment of the invention without intending to restrict the scope thereof. All parts are parts by weight, all temperatures are in degrees Fahrenheit, and all percents are weight percents.

EXAMPLE I

A sweet chocolate coating was prepared from a formula of 326 grams of a hard butter consisting of 75 parts glycerol tricaprin and 25 parts glycerol trilaurin; 122 grams cocoa powder, 548 grams sugar, 0.96 gram of salt, 3.85 grams of lecithin, and 0.6 gram of vanillin. First the hard butter and lecithin were melted by heating to a temperature of 130° F. and mixed until the emulsifier was blended therein. Then the remaining dry ingredients were added to the molten hard butter and emulsifier and blended at a temperature of 130° F. to obtain proper dispersion and wetting. The blended coating mass then was passed through a refiner. Then the mass was remelted to a temperature of 130° F. and mixed for about 12 hours. After the mixing period, the coating composition was allowed to temper by cooling slowly from 130° to about 80° F. The tempered mass was applied to a candy bar as a coating. The resultant candy possessed a coating of extremely desirable eating qualities; that is, it has good snap and melts rapidly producing a cooling sensation in the mouth.

What is claimed is:

1. A composition having hard butter characteristics consisting essentially of from about 45% to 80% of glycerol tricaprin, from about 20% to 55% glycerol trilaurin, and 0% to 8% of a partial glyceride with the fatty acid moiety having from 8 to 22 carbon atoms.

2. The composition of claim 1 wherein said percentage of tricaprin is from 60% to 75% and said percentage of glycerol tricaprin is from 25% to 40% of glycerol trilaurin.

3. A confectioners coating containing a hard butter, sugar, salt, emulsifier, and flavoring, said hard butter being a physical blend of from 45% to 80% by weight of a glycerol tricaprin, 20% to 55% of glycerol trilaurin, and 0% to 8% of a fatty acid partial ester of glycerol, the fatty acid moiety having from 8 to 22 carbon atoms.

4. The confectioners coating of claim 3 wherein said percentage tricaprin is from 60% to 75% and said percentage of glycerol trilaurin is from 25% to 40% by weight in said hard butter.

References Cited

UNITED STATES PATENTS

| 3,199,984 | 8/1965 | Jensen et al. | 99—118 H |
| 3,333,968 | 8/1967 | Bell et al. | 99—118 H |
| 3,512,994 | 5/1970 | Brown et al. | 99—118 H |
| 3,658,555 | 4/1972 | Menz et al. | 99—122 R |

A. LOUIS MONACELL, Primary Examiner

J. M. HUNTER, Assistant Examiner

U.S. Cl. X.R.

426—214